United States Patent Office

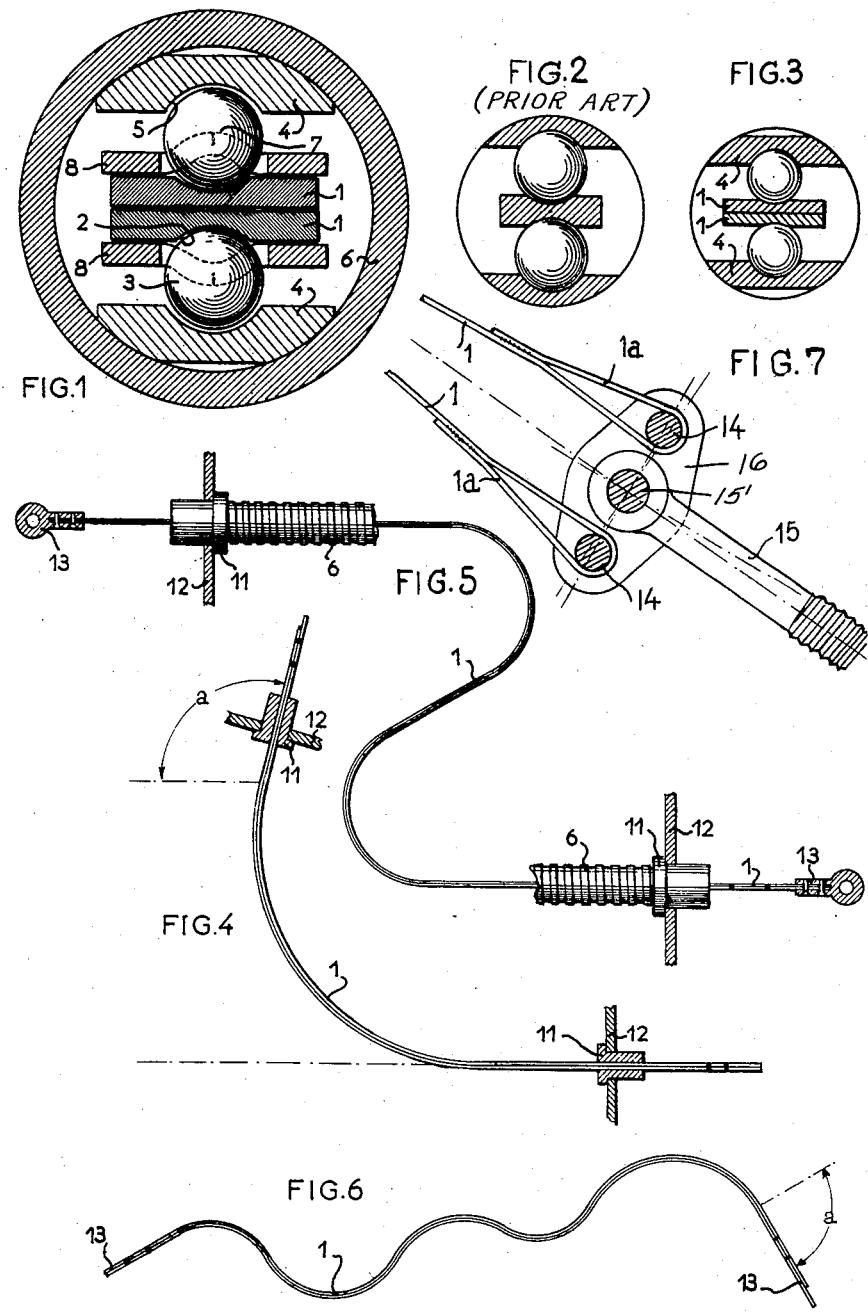

2,845,813
Patented Aug. 5, 1958

2,845,813

FLEXIBLE TRANSMISSION

Raymond Richoux, Paris, France

Application April 5, 1956, Serial No. 576,417

Claims priority, application France April 8, 1955

3 Claims. (Cl. 74—501)

The present invention relates to flexible tubular remote control devices adapted for transmitting traction or compression forces by the action of a flat core moving axially to and fro in a sheath and acting upon a controlled element, for instance a brake or contact, situated at a certain distance from the operating point, the said core being guided between two rows of balls in rolling engagement with said core, and each with one of two opposite flat guides secured along the inner face of the sheath.

A flexible transmission of this type is usually given a more or less sinuous configuration. In these conditions, in each curved portion of the sheath, the fibres of the above mentioned flat core are continuously subjected to stretching or compression stresses, the value of which is a function of the distance of said fibres to the neutral layer of the core and the radius or curvature of said portion. Now, in the neighbourhood of each change of curvature of the sheath said stresses moreover continuously vary as the flat core is moved, which increases the fatigue of the metal.

Thus, for a given minimum radius of curvature of the sheath and for a given composition of the metal, the thickness of the core will be limited. For example, in most usual applications, it has been found that the thickness of a steel core cannot practically exceed 1.3 mm. owing to the value of the minimum radius of curvature.

Moreover, the traction and compression forces to be alternately transmitted, add their straining action to that of the above mentioned bending stresses, as the core is moved to and fro so that finally, for a given minimum radius of curvature to be given to the sheath, the core will be capable of transmitting but limited forces.

An object of the invention is to provide a transmission of the aforesaid type, which is capable of transmitting traction or compression forces much heavier than those transmitted by the known devices of this kind, all other things being equal and, in particular, for a same minimum possible radius of curvature of the sheath.

This result is reached, according to the invention, by designing the core in the shape of two flat strips arranged flat against each other.

It will be easily understood that, for each radius of curvature of the transmission, the stretching and compression stresses in the fibres of each of the strips of the core are then the same as if this strip were constituting the whole core of the transmission while the latter is capable of transmitting forces twice greater since the thickness and hence the cross-section of the core is doubled.

The question may be approached from another standpoint. In a particular transmission the core of which is constituted by a single flat strip, if this strip is split into two thinner strips, it becomes possible, all other factors being unchanged, to make the transmission assume a configuration with radii of curvature twice as small, without the stress in the core being increased.

In order to take into account the eventual difference in the length of the neutral fibres in both strips of the core according to the configuration imparted to the transmission, both adjacent ends of the core strips may be connected by a lost motion connection.

From another point of view, when known transmissions of the type described are used to transmit compression forces, the end portions of the core are usually provided with a sliding sleeve having a large cross-section to avoid any buckling effect. By virtue of this arrangement, any buckling of the end of the core projecting from the end of the sheath is prevented, but, nevertheless, the portion of the core comprised between the inner end of such a sliding sleeve and the guiding balls near said end, is subjected to buckling and bending stresses. The length of this portion is substantially equal to half the stroke of the core at one of the stroke ends of the latter. With the twin core of the invention, it is possible, by uniting both strips in the portion thereof subjected to buckling and bending stresses, while preserving the same degree of flexibility for the transmission, to double the cross-section of the core and, therefore, to multiply its resistance to kinking by $2^3$, i. e. by 8. This increase in the resistance to buckling is such that, in most cases, the sliding sleeve may be eliminated, particularly when the stroke is relatively short.

In order to increase still further the flexibility of the transmission while reducing the minimum radius of curvature admissible, each of the two ball guides is also flat rather than offering the conventional shape of a segment of a circle, and both guides are positioned nearer the core while the diameter of the balls is reduced. This makes it possible to increase the width of the guides for the same cross-section area. Moreover, bringing the guides nearer each other reduces the difference between the lengths of the geometrical lines along which these two guides extend in a curved or undulated configuration of the transmission, which facilitates the installation of the transmission.

The transmission according to the invention, therefore, actually constitutes two identical transmissions operating simultaneously. These transmissions are strictly symmetrical with respect to the longitudinal mid-plane which is the plane of contact of both flat core strips.

This arrangement which actually comprises two independent transmissions makes it possible to increase the safety factor of the whole transmission to a considerable extent. In fact, the device may be dimensioned in such a manner that the elements of each of the transmissions contained in one sheath are subjected only to acceptable stresses in case one of them should break. Under these conditions, a dual control is obtained which possesses the safety factor usually required.

Other objects and advantages of the invention will be apparent to those skilled in the art, from a consideration of the following description of one embodiment of the invention, shown by way of example, in the accompanying drawings, in which:

Fig. 1 is a cross-section of a flexible transmission according to the invention.

Figs. 2 and 3 are comparative diagrammatical cross-sections of a transmission of known design and a transmission according to the invention, respectively.

Figs. 4, 5 and 6 diagrammatically illustrate configurations the transmission of the invention may assume in a few illustrative typical examples, and Fig. 7 shows the connections of a double core according to the invention with swing-bar end transmissions.

Referring first to Fig. 1, a flexible transmission according to the invention comprises an axial core made of two flat strips 1, 1 independent from each other and arranged flat against each other. Each of these strips has a groove 2 on its outer face. Two guides 4, 4 also flat in cross-section and each having a groove or rolling track 5 in the faces thereof facing each other are applied against the inner face of a suitable cylindrical sheath 6 which holds the whole assembly together. The core 1, 1 is held on the axis of the sheath 6 by two rows of balls 7 in rolling engagement with the grooves in the axial core and lateral guides. The spacing between the balls in any given row of balls is ensured by cage forming strips 8, 8 in a known manner.

Both ends of the sheath 6 are each provided with a fitting 11 as may be seen, on a smaller scale, in the illustrative embodiment shown in Fig. 5 and adapted to be secured to stationary walls or partitions 12, while both ends of the twin core 1, 1 are rigid with connecting parts 13, 13. Any axial movement of one of the parts 13, 13 is integrally transmitted to the other through the medium of the core 1, 1 supported by the balls 3 between the guides 4, 4.

In the preamble to this specification, it has been explained that substituting a twin-core formed by two independent flat strips 1, 1 (Fig. 3) for a single core in a transmission such as that diagrammatically represented in Fig. 2, said twin core having a cross-section equal to that of the single core, makes it possible to reduce by 50% the radii of curvature of the various portions of the transmission, every other factor being unchanged.

Fig. 3 also shows the manner in which the guides 4 may be brought nearer each other with respect to the conventional arrangement of Fig. 2. For this purpose, the diameter of the balls is reduced. In this manner, rather thin guides may be designed without impairing their resistance, since they may have a wider cross-section owing to the fact that the chords along which they lie are nearer to the diameter.

It should be noted that, when the configuration of the transmission is in the shape of an S and that the ends of the transmission extend in parallel directions as in Fig. 5 for instance, the lengths of the neutral fibres of both parts of the core are equal so that the latter act as if they were independent of each other, although they have been made rigid with each other at their ends when in a rectilinear configuration. This explanation is still true for more complicated winding configurations provided the number of bends on one side of the core is equal to the number of bends on the other side thereof with radii of curvature respectively equal to one another, or provided that their numbers and radii of curvature be such as to make up for the differential between the lengths of the neutral fibres in both core parts due to the bends.

In the configuration shown in Fig. 4, the directions of the end portions of the transmission make an angle "a" and said portions are bent together along one single arc of a circle. In these conditions, if the core parts were made rigid with one another before bending, one of them would undergo stretching and the other one compression stresses. Even in this case, however, the twin-core would still be more advantageous than a single one of double thickness since said stresses are distributed along the whole length of the twin core instead of being localised in the bent portion as with a single core. It is possible, moreover, to eliminate such stresses entirely, in the case where the angle "a" between the end portions of the core remains constant, by making both portions of the core, at least at one of their ends, rigid with each other only after the transmission has been bent. The difference of the lengths between both core portions is maintained regardless of the longitudinal position of the core in the sheath. It is also possible, at least at one end of the transmission, to connect both portions of the core by means of a lost motion connection. In this manner, should the configuration of the transmission cause the length of one of the core portions to be shorter or longer than the length of the other portion, from the moment the lost motion is taken up, both portions of the core are stressed simultaneously. In practice, due to the substantial length of such transmissions, the additional stress in one core part over the stress in the other core part is maintained within acceptable limits.

Alternatively, the slight relative shift between the ends of the flat strips 1, 1 of the core may be compensated at least at one end of said core by means of a swing-bar connection, e. g. of the type shown in Fig. 7 where each core strip 1 has been given the shape of a loop 1a hooked on a pin 14. Both pins 14 are carried by a lever 16 pivotally connected at a point 15' midway between the pins to a freely orientable sleeve 15.

With this arrangement, it is clear that a traction stress exerted on the sleeve 15 is uniformly distributed between the core-strips 1 under the "whiffletree" like action of the lever 16 bearing the pins 14.

Fig. 6 shows, as an illustration, a transmission the configuration of which assumes any undulated line. The end portions of this transmission are inclined by an angle "a" to each other and all that has been explained with reference to the transmission of Fig. 4 as regards the stresses is applicable also to the illustration of Fig. 6. The only determining factor is the angle between the directions of the end portions of the transmission regardless of the intermediate undulations.

What is claimed is:

1. A flexible tubular remote control device comprising in combination, a sheath, two flat guides parallely extending throughout said sheath in fixed relationship therewith, a longitudinal groove along the middle of the inner face of each one of said guides, a flat core made of two flat strips juxtaposed in said sheath in parallel relationship with said guides, a longitudinal groove along the middle of the outer face of each one of said strips, rolling bodies of uniform diameter arranged in said grooves in rolling engagement with said strips and said guides and cage means to limit relative displacements between the rolling bodies located on each side of said core.

2. A flexible transmission device according to claim 1, further comprising connecting means adapted to be rigidly secured to the corresponding end portions of the core strips and means for longitudinal relative preadjustment of the adjacent ends of the core strips prior to securing said ends to said connecting means.

3. A transmission device according to claim 1, wherein at least at one end of the core, said core strips are given the shape of loops, and comprising connecting means having a swing-bar provided with pins adapted to engage said loops and a tension-transmitting sleeve pivotally connected to said swing-bar at a point midway between said pins.

References Cited in the file of this patent
UNITED STATES PATENTS

| 2,012,398 | McKenzie | Aug. 27, 1935 |
| 2,296,367 | Nelson | Sept. 22, 1942 |
| 2,372,204 | Herkert | Mar. 27, 1945 |

FOREIGN PATENTS

| 801,478 | France | May 23, 1936 |